United States Patent
Yamazaki (10) Patent No.: US 7,400,372 B2
(45) Date of Patent: Jul. 15, 2008

(54) LIQUID CRYSTAL DEVICE AND ELECTRONIC APPARATUS

(75) Inventor: Katsunori Yamazaki, Matsumoto (JP)

(73) Assignee: Sanyo Epson Imaging Devices Corp., Tokyo (JP)

( * ) Notice: Subject to any disclaimer, the term of this patent is extended or adjusted under 35 U.S.C. 154(b) by 332 days.

(21) Appl. No.: 11/324,561

(22) Filed: Jan. 4, 2006

(65) Prior Publication Data

US 2006/0221285 A1  Oct. 5, 2006

(30) Foreign Application Priority Data

Mar. 30, 2005  (JP) ............. 2005-097192

(51) Int. Cl.
 *G02F 1/1335* (2006.01)
(52) U.S. Cl. .................. 349/121; 349/138; 349/139
(58) Field of Classification Search ........... 349/113, 349/114, 67, 58, 104, 121, 139, 127, 138, 349/143, 147, 153, 193, 139.138
See application file for complete search history.

(56) References Cited

U.S. PATENT DOCUMENTS

| 6,064,460 A | * | 5/2000 | Ohta et al. ............. 349/141 |
| 6,111,626 A | | 8/2000 | Watanabe et al. |
| 6,137,227 A | * | 10/2000 | Kim et al. ............. 313/582 |
| 6,426,787 B1 | * | 7/2002 | Satake et al. ............ 349/138 |
| 6,972,821 B2 | * | 12/2005 | Yasuda et al. ........... 349/155 |
| 2003/0058374 A1 | * | 3/2003 | Takeda et al. ........... 349/33 |

FOREIGN PATENT DOCUMENTS

| JP | A-09-171187 | 6/1997 | |
| JP | A-11-119248 | 4/1999 | |
| JP | A-11-223830 | 8/1999 | |
| JP | A-2000-029028 | 1/2000 | ........... 349/121 |
| JP | A-2001-027764 | 1/2001 | |

* cited by examiner

*Primary Examiner*—Brian M Healy
(74) *Attorney, Agent, or Firm*—Oliff & Berridge, PLC (57) ABSTRACT

A liquid crystal device which performs display in a plurality of dot regions includes a first substrate and a second substrate which face each other with a liquid crystal layer interposed therebetween; and a first electrode and a second electrode that are provided on a surface of the first substrate facing the liquid crystal layer, and applies an in-plane electric field to the liquid crystal layer in the dot regions. The first electrode and/or a second electrode has a dielectric film that partially covers a surface of the first electrode and/or the second electrode; and an electrode exposure part that exposes the surface of the first electrode and/or the second electrode.

15 Claims, 7 Drawing Sheets

LIQUID CRYSTAL DEVICE AND ELECTRONIC APPARATUS

BACKGROUND

1. Technical Field

The present invention relates to a liquid crystal device and to an electronic apparatus.

2. Related Art

A liquid crystal device has been widely known as a display device of an electronic apparatus such as a portable terminal.

As an example of such a liquid crystal device, a device for controlling alignment of liquid crystal molecules by applying an in-plane electric field to a liquid crystal layer (hereinafter, refer to transverse electric field system) has been known. According to the type of the electrode that applies the electric field to the liquid crystal, IPS (In-Plane Switching) system or FFS (Fringe-Field Switching) system has been known (for example, referred to as JP-A-2000-29028).

However, in the liquid crystal device according to the IPS system or the FFS system, coloration or hue is varied according to a view direction of a display surface because the liquid crystal molecules are uniformly oriented toward one direction when applying the voltage.

SUMMARY

An advantage of some aspects of the invention is that it provides a liquid crystal device of a transverse electric field system capable of displaying a display image with the same chromatism even in a different viewing direction of a display surface, and provides an electronic apparatus which includes the corresponding liquid crystal device.

A liquid crystal device which performs display in a plurality of dot regions includes a first substrate and a second substrate which face each other with a liquid crystal layer interposed therebetween; and a first electrode and a second electrode that are provided on a surface of the first substrate facing the liquid crystal layer, and applies an in-plane electric field to the liquid crystal layer in the dot regions. The first electrode and/or a second electrode has a dielectric film that partially covers a surface of the first electrode and/or the second electrode; and an electrode exposure part that exposes the surface of the first electrode and/or the second electrode.

Here, if a voltage is applied between the first electrode and the second electrode, the electric field around the dielectric film and the electric field around the electrode exposure part are generated between the first electrodes and the second electrodes. The electric field having different dielectric property is generated around the dielectric film. Accordingly, the intensity of the electric field around the dielectric film is different from the intensity of the electric field around the electrode exposure part. Thus, an equipotential line is distorted toward an extending direction of the first and second electrodes and the oblique electric field is generated. According to the generation of the oblique electric field, the liquid crystal molecules can be oriented in the clockwise or counterclockwise direction. Accordingly, equal coloration can be maintained even in a different viewing direction of the liquid crystal device.

In the liquid crystal device according to the aspect of the invention, the dielectric film on one of the first electrode and the second electrode is formed so as to face the center of the electrode exposure part on the other electrode.

By making the dielectric film face the center of the electrode exposure part, an oblique electric field is generated from the dielectric film to both sides of the center of the electrode exposure part. According to the oblique electric field, it is possible to arrange the liquid crystal molecules in clockwise or counterclockwise direction. Accordingly, equal coloration can be maintained even in a different viewing direction of the liquid crystal device.

In the liquid crystal device according to the aspect of the invention, the dielectric films are formed on both sides of the electrode exposure part.

Here, in the dielectric films formed on both sides of the electrode exposure part, the oblique electric field is generated. Accordingly, the oblique electric field at the one electrode and the oblique electric field at the other electrode can be generated at the same time and the same result can be achieved.

In the liquid crystal device according to the aspect of the invention, the first electrode and/or the second electrode include concave parts whose width is partially thinned and the dielectric films are buried in the concave parts.

It is preferable that a flat surface in which the surface of the dielectric film and the surface of the electrode exposure part are continuously formed with each other be formed.

As doing this, at the first electrode and the second electrode, the dielectric film can be formed without projection of the dielectric film in a direction perpendicular to the electrode extending direction. In addition, even though the dielectric film does not have projection, the intensity of the electric field around the dielectric film is different from the intensity of the electric field around the electrode exposure part. Thus, the oblique electric field can be generated and the same effect can be achieved.

In the liquid crystal device according to the aspect of the invention, the electrode exposure part formed on one of the electrodes and the electrode exposure part formed on the other electrode are disposed at different positions in an extending direction of the corresponding electrode.

As doing this, distribution of the oblique electric field generated between the electrode exposure parts and the dielectric films are different in the strip electrodes. Thus, according to the differently generated oblique electric field, the liquid crystal molecules can be generated in clockwise or counterclockwise direction. Accordingly, the equal coloration can be maintained even in the different viewing direction of the liquid crystal device.

In the liquid crystal device according to the aspect of the invention, the first electrode and the second electrode may be IPS type electrodes.

In other words, a transverse electric field system that the first electrode is opposite to the second electrode on the same layer in plan view can be used. For example, both the first electrode and the second electrode are arranged in a comb shape in plan view, and the strip electrodes which consist of the comb-shape part can be alternately disposed to each other.

In the liquid crystal device according to the aspect of the invention, the first electrode and the second electrode may be FFS type electrodes.

In other words, while one of the first electrode and the second electrode is formed in a mat state in plan view and the dielectric film is formed on the corresponding mat state electrode so that the other electrodes which is formed in a comb shape in plan view can be formed on the dielectric film. In the FFS type liquid crystal device, the first electrode and the second electrode are formed in a mat state. Accordingly, by using the FFS type electrode, structure of the liquid crystal device can be reduced and easily manufactured.

In the liquid crystal device according to the aspect of the invention, the first electrode and the second electrode may be connected to a thin film transistor.

With this structure, the voltage can be applied to the liquid crystal layer between the first electrode and the second electrode in order to switch the thin film transistor.

In the liquid crystal device according to the aspect of the invention, the first electrode and the second electrode may be connected to a thin film diode.

With this structure, the voltage can be applied to the liquid crystal layer between the first electrode and the second electrode in order to switch the thin film diode.

An electric apparatus according to the other aspect of the invention may include the described above liquid crystal device. As doing this, the electric apparatus can display images with equal chromatism even in a different viewing direction of the liquid crystal device.

BRIEF DESCRIPTION OF THE DRAWINGS

The invention will be described with reference to the accompanying drawings, wherein like numbers reference like elements.

DESCRIPTION OF EXEMPLARY EMBODIMENTS

A liquid crystal device according to a first embodiment of the present invention will be described with reference to drawings.

In addition, a scale of each layer or member is adjusted in order to have a recognizable size in the drawings.

First Embodiment

The liquid crystal device according to the first embodiment uses an IPS system which is a transverse electric field system which displays an image by applying an in-plane electric field to the liquid crystal to control orientation thereof.

The liquid crystal device according to the present embodiment is a color liquid crystal device which has color filters on the substrate in which one pixel is configured by three dots that emit R (red), G (green), B (Blue) color light components, respectively. Accordingly, a display region serving as a minimum unit for display is referred as to a 'dot region', and a display region formed by a set of dots (R, G, and B) is referred as to a 'pixel region'.

Figure 1:
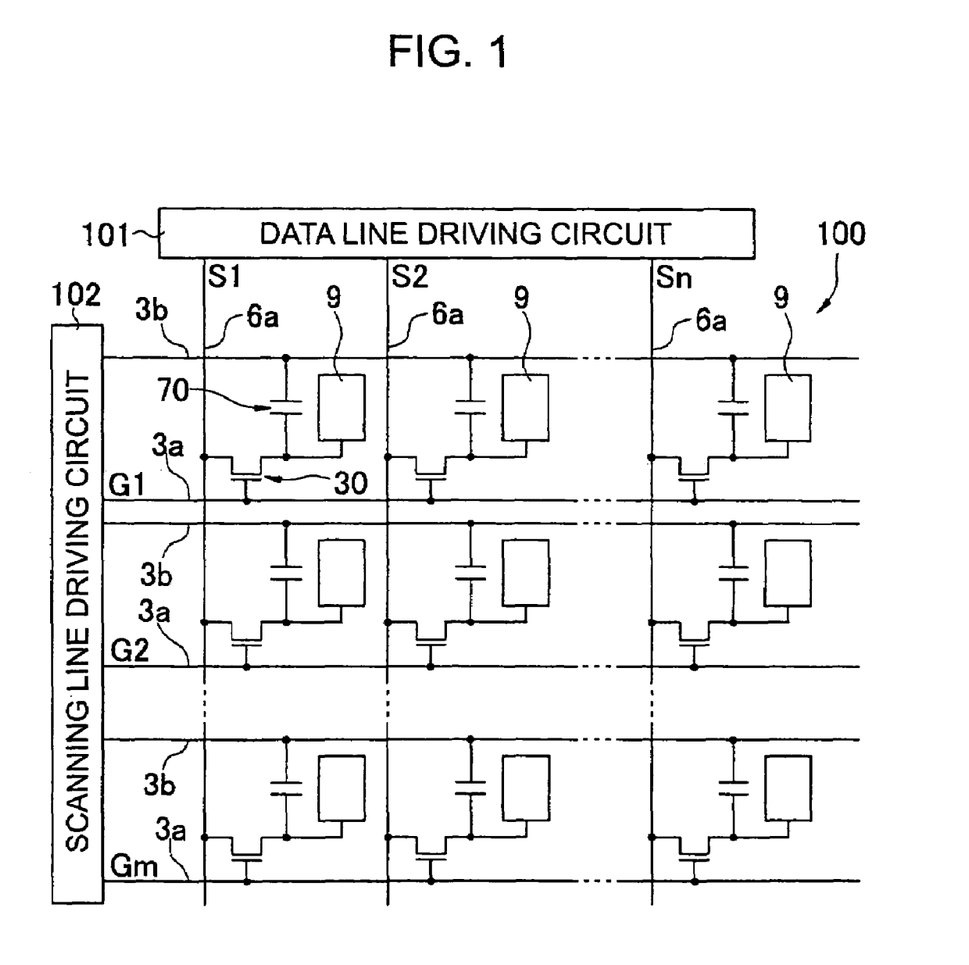
FIG. 1 is a circuit diagram showing a liquid crystal device according to a first embodiment of the invention.
Figure 2:
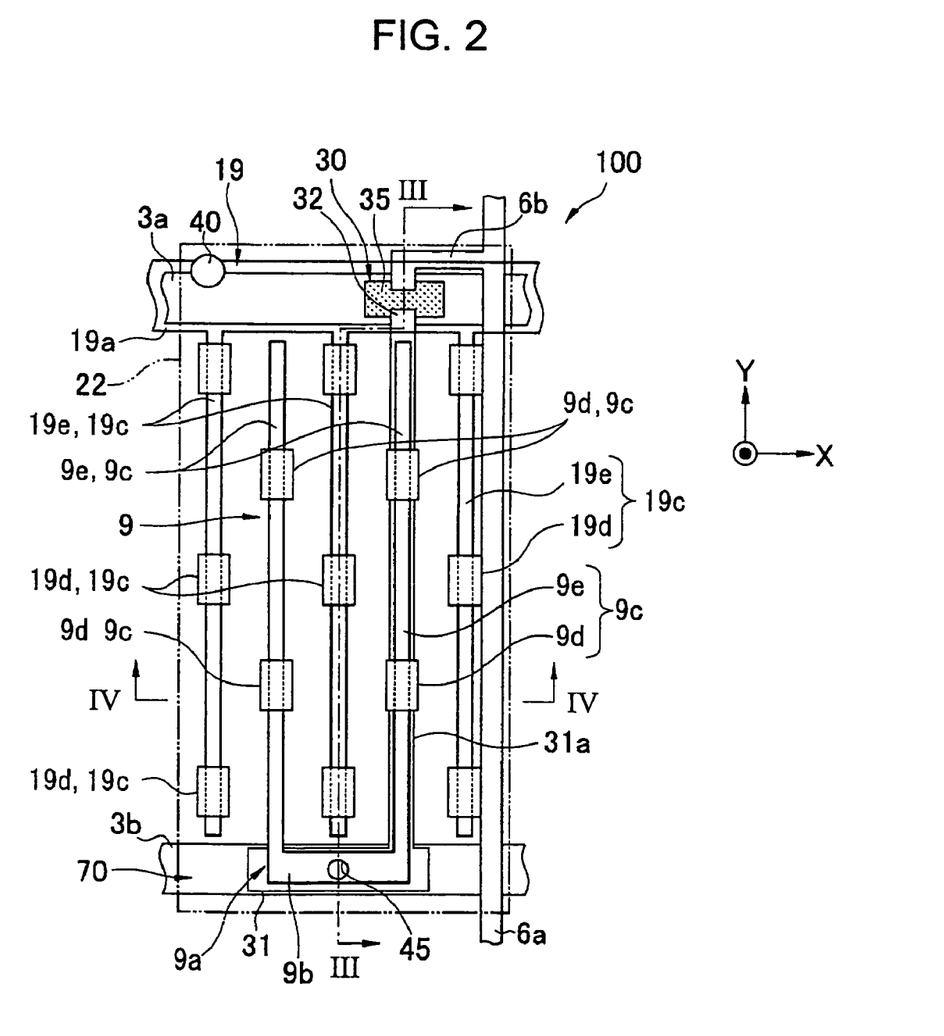
FIG. 2 is a plan view of one dot region at the liquid crystal device according to the first embodiment of the invention.
Figure 3:
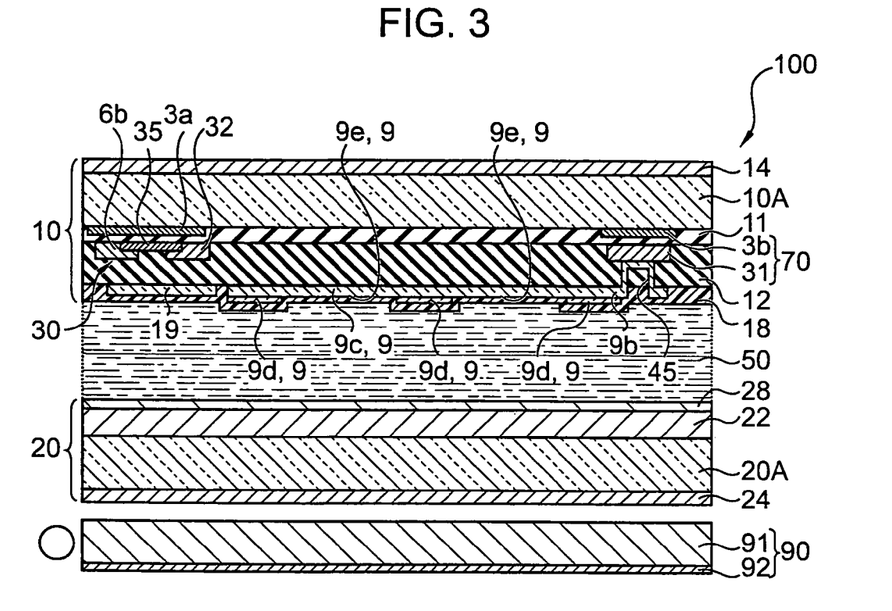
FIG. 3 is a cross-sectional view taken along the line III-III of FIG. 2.
Figure 4:
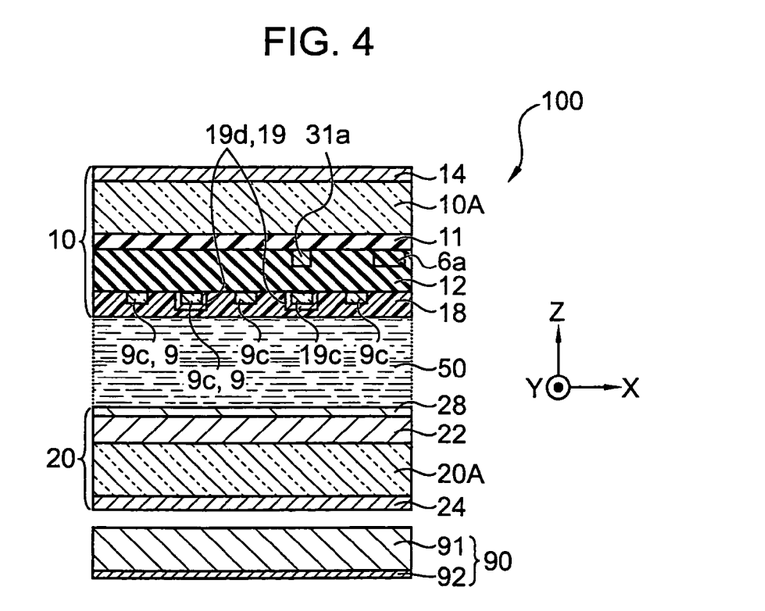
FIG. 4 is a cross-sectional view taken along the line IV-IV of FIG. 2.

FIG. 1 is a circuit diagram of a plurality of dot regions formed in a matrix in order to form the liquid crystal device according to the present embodiment. FIG. 2 is a plan view of one dot region at the liquid crystal device 100. FIG. 3 is a partial cross-sectional view taken along the line III-III of FIG. 2. FIG. 4 is a cross-sectional view taken along the line IV-IV of FIG. 2.

As shown in FIG. 1, each of a plurality of dot regions formed in the matrix in order to form an image display region of the liquid crystal device 100 includes a pixel electrode 9 and the TFT (thin film transistor) 30 which controls to switch each pixel electrode 9. Each data line 6a extending from a data line driving circuit 101 is electrically connected to source of the TFT 30. The data line driving circuit 101 supplies image signal S1, S2, ..., Sn to individual pixels through the corresponding data lines 6a. The pixel signals S1 to Sn may be line-sequentially supplied, or may be supplied to a group of a plurality of data lines 6a which are adjacent to each other, or may be supplied to all of the data lines 6a at the same time.

In addition, gates of the TFTs 30 are electrically connected to scanning lines 3a extending from a scanning line driving circuit 102. Scanning signals G1, G2, ..., Gm, which are supplied to the scanning lines 3a from the scanning line driving circuit 102 in a pulsed manner at a predetermined time, are line-sequentially applied to the gates of the TFTs 30. The pixel electrodes 9 are electrically connected to drain of the TFTs 30 in this order. If the TFTs 30 serving as switching elements, are turned on during a predetermined period by inputting the scanning signals G1, G2, ..., Gm, the image signals S1, S2, ..., Sn supplied from the data lines 6a are written into the pixel electrodes 9 at a predetermined time.

The image signals S1, S2, ..., Sn with a predetermined level, which are written into the liquid crystal through the pixel electrodes 9, are held in a predetermined period between the pixel electrodes 9 and common electrodes which are opposite to each other with the liquid crystal interposed therebetween. Here, storage capacitors 70 are formed parallel to liquid crystal capacitors provided between the pixel electrodes 9 and the common electrodes in order to prevent the leakage of signals. The storage capacitors 70 are provided between the drains of the TFTs 30 and capacitive lines 3b.

Next, the liquid crystal device 100 will be described in detail with reference to FIGS. 2 to 4. The liquid crystal device 100, as shown in FIG. 3, is formed such that a liquid crystal layer 50 is interposed between a TFT array substrate (first substrate) 10 and a counter substrate (second substrate) 20. The liquid crystal layer 50 is sealed between the substrates 10 and 20 by a sealant, not shown in FIG. 3, provided along outside edges of the region that the TFT array substrate 10 faces the counter substrate 20. A back light 90 which includes a light guide plate 91 and a reflective plate 92 is provided on a rear side (bottom side in this drawing) of the counter substrate 20.

As shown in FIG. 2, the dot region of the liquid crystal device 100 includes elongated pixel electrode 9 (second electrode) extending in a Y axis direction that is substantially comb shape in plan view and the common electrode (first electrode) 19 extending in a X axis direction with a substantially comb shape in a plan view. A columnar spacer 40 is provided in upper-left corner in the drawing so as to separate the TFT array substrate 10 and the counter substrate 20 with a predetermined interval.

Each of the pixel electrode 9 includes a plurality of (two in this drawing) strip electrodes 9c that extends in the Y axis direction, an edge 9a connected to end of the plurality of strip electrodes 9c, as shown in the bottom part of the drawing (−Y direction), and extending in X axis direction, and a contact 9b that extends from the center of X axis direction of the edge 9a to −Y axis direction. Each of the strip electrodes 9c includes a plurality of dielectric films 9d which cover a part of the corresponding strip electrode 9c. Portions which are not covered by the dielectric films 9d are electrode exposure parts 9e in which surfaces of the strip electrodes 9c are exposed. Accordingly, the dielectric films 9d are provided on both sides of the electrode exposure part 9e.

The common electrode 19 includes a plurality of strip electrodes 19c (three in the drawing) which are alternately disposed with the strip electrodes 9c of he pixel electrode 9 and extended parallel to the strip electrodes 9c (Y axis direction), and a main line 19a connected to ends of the +Y direction of the strip electrodes 19c and extending in the X direction. The common electrode 19 is an electrode member which has a comb shape in plan view and extending over the plurality of dot regions disposed in the X axis direction. A plurality of dielectric films 19d which cover a part of the corresponding strip electrodes are provided on each of the strip electrodes 19c. Portions parts which are not covered by the dielectric films 19d are electrode exposure parts 19e that surfaces of the strip electrodes 19c are exposed. Accordingly, the dielectric films 19d are provided on both sides of the electrode exposure parts 19e.

Here, a relative positional relationship of the dielectric films 9d and 19d and the electrode exposure parts 9e and 19e of the strip electrodes 9c and 19c will be described in detail.

The plurality of dielectric films 9d are provided on the strip electrodes 9c with the same predetermined interval as that of the plurality of derivative electrode films 19d provided on the strip electrodes 19c. In addition, the centers of the electrode exposure parts 9e each of strip electrode 9c are disposed to face the dielectric film 19d of the strip electrode 19c. In addition, a center of the electrode exposure parts 19e each of strip electrode 19c are disposed to face the dielectric films 9d of each strip electrode 9c. That is, the electrode exposure parts 9e provided in the strip electrodes 9c and the electrode exposure part 19e provided in strip electrodes 19c are alternately disposed in an extending direction of the strip electrodes 9c and 19c.

Accordingly, the dielectric films 9d and 19d are disposed between the strip electrodes 9c and 19c at regular intervals.

In the dot region shown in FIG. 2, a voltage is applied between two strip electrodes 9c that extend in the Y axis direction and three strip electrodes 19c disposed between these strip electrodes 9c such that the electric field in XY direction (in-plane direction) is applied to the liquid crystal of the corresponding dot region to drive it. The strip electrodes 9c are surrounded by the strip electrodes 19c while the strip electrodes 9c and 19c having a comb shape are alternately disposed. If the TFTs 30 are turned off, the pixel electrodes 9 have a high impedance to easily affect the adjacent data line or the like. As described in the present embodiment, the pixel electrode 9 can be stabilized such that the strip electrodes 9c of the pixel electrodes 9 are surrounded by the strip electrodes 19c of the common electrodes.

In addition, the dot regions shown in FIG. 2 includes the data line 6a extending in the Y axis direction, the scanning line 3a extending in the X axis direction, and the capacitive line 3b extending parallel to the scanning line 3a at a peripheral of the dot region which is opposite to the scanning line 3a. The TFTs 30 are provided in the vicinity of intersections of the data line 6a and the scanning line 3a. The TFTs 30 includes a semiconductor layer 35 formed of amorphous silicon which is partially provided in a planar region of the scanning line 3a and a source electrode 6b and a drain electrode 32 which partially overlap the semiconductor layer 35 in a plan view. Each of the scanning line 3a functions as gate electrodes of the TFT 30 in a portion overlapping the semiconductor layer 35 in a plan view.

The source electrode 6b of the TFT 30 is branched from the data line 6a and extending in the semiconductor layer 35, so that the source electrode 6b forms in a substantially L shape in a plan view. The drain electrode 32 is electrically connected to a connecting line 31a at an end in the −Y direction. The connecting line 31a extends along the −X direction of the dot region and electrically connects the scanning line 3a and the capacitor electrode 31 provided in opposite to the scanning line 3a with the pixel electrode 9 interposed therebetween. The capacitor electrode 31 is a substantially rectangle conductive member which is formed by overlapping the capacitive line 3b in the plan view. On the capacitor electrode 31, the contact 9b of the pixel electrode 9 is disposed so as to overlap the capacitor electrode in a plan view. A pixel contact hole 45 which electrically connects the capacitor electrode 31 and the pixel electrode 9 is provided in a portion that the capacitor electrode 31 overlaps the contact 9b. In addition, the storage capacitor 70 is provided in a portion that the capacitor electrode 31 overlaps the capacitive lines 3b in a plan view. The storage capacitor 70 allows the capacitor electrode 31 and the capacitive line 3b, which is opposite to the capacitor electrode 31 in a thickness direction, to function as the electrodes.

In the dot region, color filters 22 which have almost the same planar shape as the dot region are provided. In the entire dot regions in the liquid crystal device 100, illumination light emitted from the back light 90 can pass through the dot regions. Accordingly, the transmissive liquid crystal device 100 can be provided.

Next, as shown in a cross-sectional view of FIG. 3, the liquid crystal layer 50 is interposed between the TFT array substrate 10 and the counter substrate 20 which is opposite to the TFT array substrate 10. Polarizer 14 and 24 are provided at the outer sides of the TFT array substrate 10 and the counter substrate 20 (surface not facing the liquid crystal layer 50), respectively.

The TFT substrate 10 uses a transmissive substrate body 10A such as glass, quartz, plastic, or the like as a main body. The substrate body 10A includes the scanning line 3a, the capacitive line 3b which are formed on the inner surface which faces the liquid crystal layer 50, and a gate insulating film 11, which covers the scanning line 3a and the capacitive line 3b and is formed of a transparent insulating film such as silicon oxide or the like of the inside.

The semiconductor layer 35 formed of amorphous silicon is provided on the gate insulating film 11. The source electrode 6b and the drain electrode 32 are provided on the gate insulating film 11 by partially overlapping the semiconductor layer 35. The drain electrode 32 is integrally formed with the connecting line 31a and the capacitor electrode 31. The semiconductor layer 35 faces the scanning line 3a with the gate insulating film 11 therebetween and the scanning line 3a functions as a gate electrode of the TFT 30 in the corresponding facing region. The capacitor electrode 31 is formed to face the capacitive line 3b with the gate insulating film 11 therebetween. The capacitor electrode 31 faces the capacitive line 3b with the gate insulating film 11 therebetween and the storage capacitors 70 allows the therebetween and the capacitor electrode 31 and the capacitive line 3b to function as the electrodes and allows the gate insulating film 11 interposed between the capacitor electrode 31 and the capacitive line 3b to function as the dielectric film.

An interlayer insulating film 12 formed of silicon oxide or the like is provided by covering the semiconductor layer 35, the source electrode 6b (data line 6a), the drain electrode 32, and the capacitor electrode 31. The pixel electrode 9 and the common electrode 19 which are formed of the transparent conductive body such as ITO are provided on the interlayer insulating film 12. The pixel contact hole 45 is formed to reach the capacitor electrode 31 through the first interlayer insulating film 12. A portion of the contact 9b of the pixel electrode 9 in buried in the pixel contact hole 45 so as to electrically connect the pixel electrode 9 and the capacitor electrode 31. The dielectric film 9d is formed on a portion of the surface of the strip electrode 9c of the pixel electrode 9. The portion where the corresponding dielectric film 9d is not formed becomes the electrode exposure part 9e. In addition, an alignment film 18, which is formed of polyimide or the like and covers the pixel electrode 9, the dielectric film 9d, the electrode exposure part 9e, and the common electrode 19, is provided.

With reference to a cross-sectional structure of IV-IV in FIG. 4, the strip electrodes 9c of the pixel electrode 9 and the strip electrodes 19c of the common electrode 19 are alternately disposed on the interlayer insulating film 12. The dielectric films 19d are provided on the surface of the strip electrodes 19c of the common electrode 19 and the portions where the dielectric films 19d are not provided are the electrode exposure parts 19e (refer to FIG. 2).

Next, the materials of the dielectric films 9d and 19d and a method of forming thereof will be described.

The dielectric films 9d and 19d are made of transparent materials such as inorganic or organic materials. The dielectric films 9d and 19d are transparent films such that display light may pass through the dielectric films 9d and 19d so as not to reduce the aperture ratio.

Here, if the dielectric films 9d and 19d are formed of inorganic materials, the transparent material such as $SiO_2$ or the like may be used. As a method of forming the dielectric films 9d and 19d formed of the $SiO_2$ film, the known photolithography method can be used. In particular, the dielectric films 9d and 19d are patterned on a part of the pixel electrode 9 and the common electrode 19 by forming the $SiO_2$ film on entire surfaces of the pixel electrode 9 and the common electrode 19, and then performing an etching process by using a photomask.

Meanwhile, if the dielectric films 9d and 19d are organic materials, the transparent material such as acrylic resin or the like may be used. As a method of forming the dielectric films 9d and 19d formed of an acrylic resin, the wet film forming method such as a liquid droplet ejecting method (Ink jet method) or the like is used. In particular, the dielectric films 9d and 19d are patterned on a part of the pixel electrode 9 and the common electrode 19 by ejecting the liquid material such as the acrylic resin from a liquid droplet ejecting head.

Next, the electric field being generated between the strip electrode 9c of the pixel electrode 9 and the strip electrode 19c of the common electrode 19 will be described with reference to FIG. 5.

Figure 5:
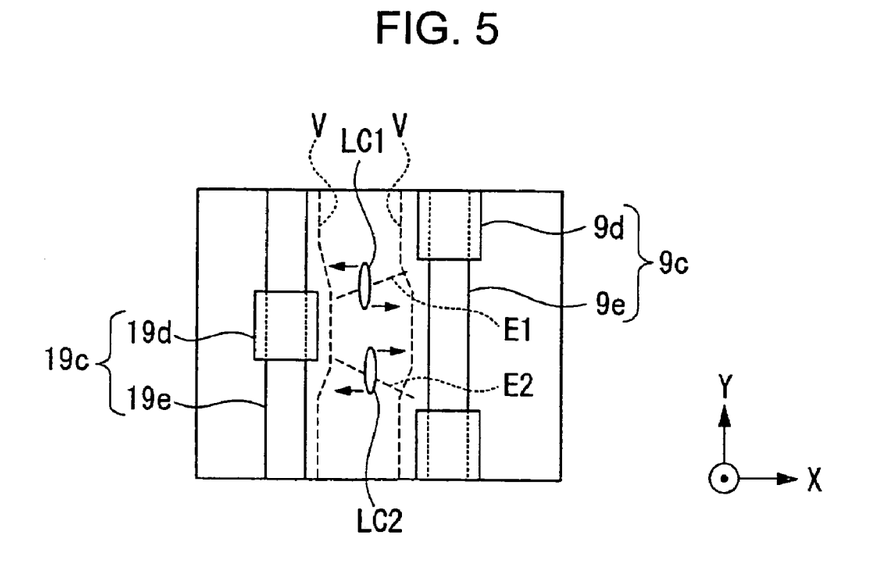
FIG. 5 is an enlarged view of an essential part in one dot region of the liquid crystal device according to the first embodiment of the invention.

FIG. 5 is an enlarged view of an essential part shown in FIG. 2 in order to describe the electric field directions and orientation directions of the liquid crystal molecules around the dielectric films 9d and 19d and the electrode exposure parts 9e and 19e.

In the liquid crystal device 100 according to the above configure, if a voltage is applied to the pixel electrodes 9 through the TFT 30, an electric field is generated around each of the strip electrode 9c and 19c. In particular, electric fields having different dielectric properties are generated around the dielectric films 9d and 19d. The intensity of the electric filed around the dielectric films 9d and 19d is different from the intensity of the electric field around the electrode exposure parts 9e and 19e.

In addition, since the dielectric film 9d faces to the electrode exposure part 19e and the dielectric film 19d faces to the electrode exposure part 9e, an equipotential line V is distorted toward the extending direction of the strip electrodes 9c and 19c and the electric fields (electric flux line) E1 and E2 are generated between the strip electrodes 9c and 19c. The corresponding electric fields E1 and E2 are oblique electric fields that include Y direction component and X direction component and the electric field E1 is not parallel to the electric field E2. That is, the electric field E1 is generated towards the dielectric film 9d shown in upper portion of FIG. 5 from the electric film 19d and the electric field E2 is generated towards the dielectric film 9d shown in lower portion of FIG. 5 from the electric film 19d. According to the directions of the electric fields E1 and E2, the liquid crystal molecules LC1 and LC2 are oriented in different directions. The electric field E1 rotates the liquid crystal molecule LC1 in a counterclockwise direction and the electric field E2 rotates the liquid crystal molecule LC2 in a clockwise direction.

In addition, since the electric fields E1 and E2 are generated around the dielectric films 9d and 19d and the electrode exposure parts 9e and 19e in FIG. 2, the liquid crystal 50 in the dot regions rotates depending on the orientation direction of the liquid crystal molecule LC1 and the orientation direction of the liquid crystal molecule LC2.

As described above, the liquid crystal device 100 according to the present embodiment rotates the liquid crystal molecules in different rotating directions by generating the oblique electric fields E1 and E2 generated between the dielectric film 9d and 19d and the electrode exposure part 9e and 19e, equal coloration can be maintained even when in a different viewing direction of the liquid crystal device 100.

Since the electrode exposure part 9e is formed on the strip electrode 9c and the electrode exposure part 19e is formed on the strip electrode 19c are disposed at different portions on the extending directions of the strip electrodes 9c and 19c, distribution of the oblique electric fields E1 and E2 generated between the electrode exposure parts 9e and 19e and the dielectric films 9d and 19d may be different in the strip electrodes 9c and 19c, respectively. Thus, according to the oblique electric fields E1 and E2 generated in different portions, the liquid crystal molecules can be arranged in a clockwise or counterclockwise direction. Accordingly, the described above effect can be achieved and the equal coloration can be maintained.

In addition, in the liquid crystal device 100 according to the present embodiment, a plurality of dielectric films 9d and 19d are provided in the strip electrodes 9c and 19c, respectively, but do not need to be provide in plural. If the dielectric film and the electrode exposure part are disposed in the same position as the present embodiment, the oblique electric fields E1 and E2 generated can achieve the same effect as in the case when one dielectric film is provided at the strip electrodes 9c and 19c.

Second Embodiment

Next, a liquid crystal device according to a second embodiment of the invention will be described with reference to FIG. 6.

In the present embodiment, only parts different from the first embodiment will be described, the same parts will be represented by the same reference numerals, and the descriptions thereof will be omitted.

Figure 6:
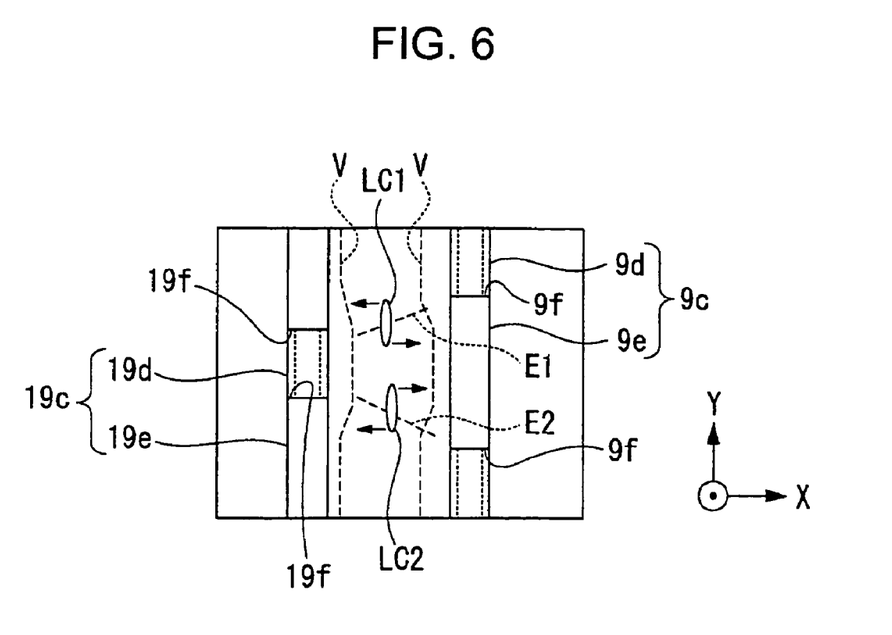
FIG. 6 is an enlarged view of an essential part in one dot region of a liquid crystal device according to a second embodiment of the invention.

FIG. 6 is an enlarged view of an essential part in FIG. 2 in order to describe the configuration of the strip electrodes 9c and 19c, and the electric field directions of the dielectric films 9d and 19d and the electrode exposure parts 9e and 19e and an orientation direction of the liquid crystal molecules.

As shown in FIG. 6, in the present embodiment, concave portions 9f and 19f are provided on each of the strip electrodes 9c and 19c and the dielectric films 9d and 19d are provided so as to fill the corresponding concave portions 9f and 19f. In addition, surfaces of the dielectric films 9d and 19d and surfaces of the electrode exposure parts 9e and 19e are continuously formed with each other the strip electrodes 9c and 19c.

Accordingly, in comparing the present embodiment with the first embodiment, the dielectric films 9d and 19d are buried by the strip electrodes 9c and 19c so as not to form projections in the present embodiment while the projections of the dielectric films 9d and 19d are formed on the strip electrodes 9c and 19c in the first embodiment.

In this configuration, if a voltage is applied to the pixel electrode 9 through the TFT 30, the electric field having different dielectric property is generated around the dielectric films 9d and 19d buried in the strip electrodes 9c and 19c. The intensity of the electric filed around the dielectric films 9d and 19d is different from the intensity of the electric field around the electrode exposure parts 9e and 19e.

Accordingly, as the same as the first embodiment, the equipotential line V is distorted, and the liquid crystal molecules LC1 and LC2 rotate in different directions depending on the directions of the electric fields E1 and E2. The electric field E1 rotates the liquid crystal molecule LC1 in a counterclockwise direction and the electric field E2 rotates the liquid crystal molecule LC2 in clockwise direction.

In addition, since the electric fields E1 and E2 are generated around the dielectric films 9d and 19d and the electrode exposure parts 9e and 19e in FIG. 2, the liquid crystal 50 in the dot regions rotates according to an orientation direction of the liquid crystal molecule LC1 and an orientation direction of the liquid crystal molecule LC2.

As described above, the liquid crystal device 100 according to the present embodiment buries the dielectric films 9d and 19d in the concave portions 9f and 19f of the strip electrodes 9c and 19c but can achieve the same effect as the first embodiment. Accordingly, equal coloration can be maintained even in a different viewing direction of the liquid crystal device 100.

In addition, in the liquid crystal device 100 according to the present embodiment, the concave portions 9f and 19f are provided such that the dielectric films 9d and 19d are buried in the strip electrodes 9c and 19c, but the dielectric film may be formed to be projection shape by providing the concave portions on the strip electrode among the strip electrodes 9c and 19c in order to bury the dielectric film while not providing the concave portions on the strip electrode. In this configuration, the electric fields E1 and E2 can be generated and the liquid crystal molecules LC1 and LC2 can rotate in different orientation directions.

Third Embodiment

Next, a liquid crystal device according to a third embodiment of the invention will be described with reference to FIG. 7 and FIG. 8.

Figure 7:
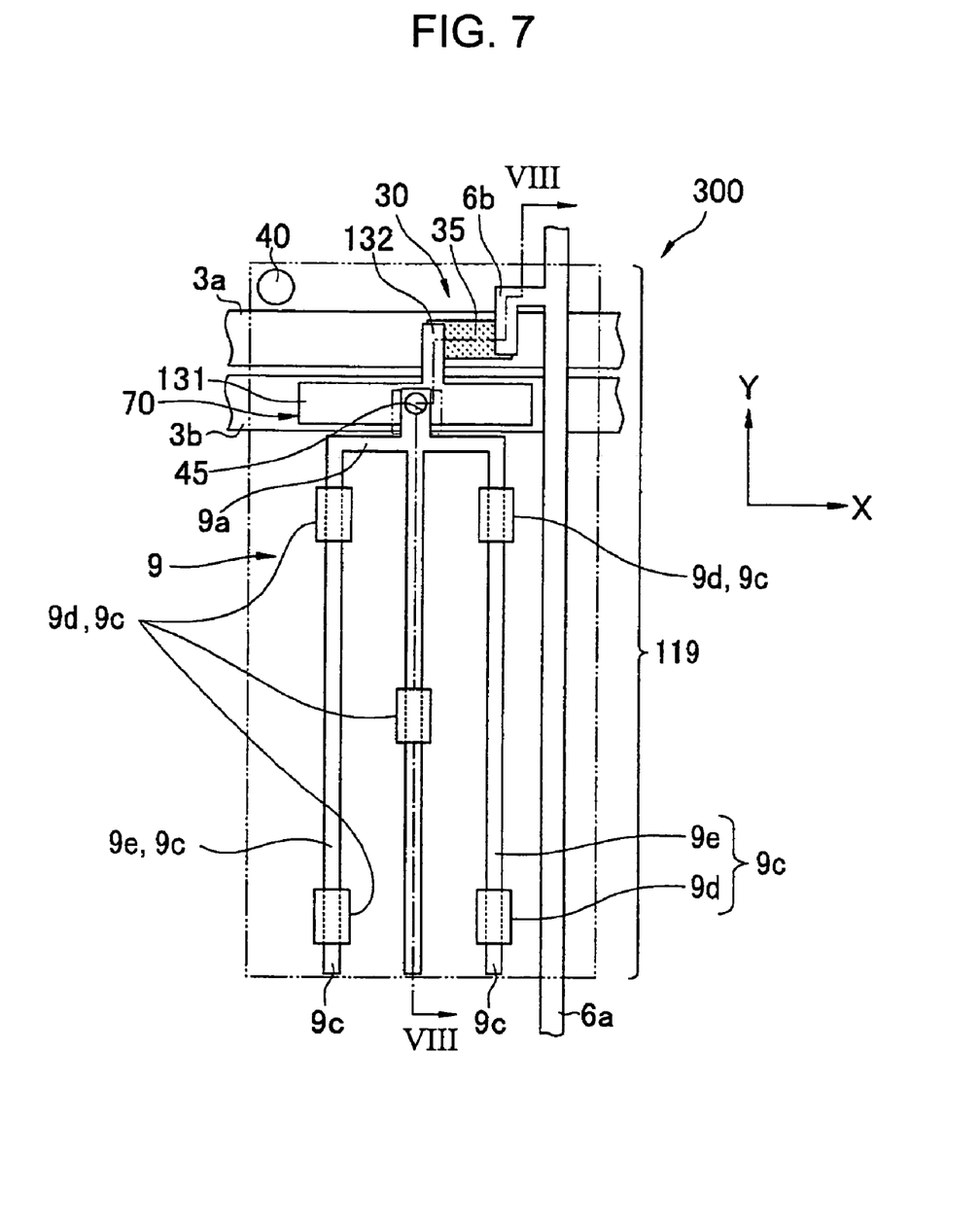
FIG. 7 is a plan view of an essential part in one dot region of a liquid crystal device according to a third embodiment of the invention.

FIG. 7 is a plan view showing one dot region in a liquid crystal device 300 according to the present embodiment. FIG. 8 is a cross-sectional view taken along the line VIII-VIII of FIG. 7.

The liquid crystal device according to the present embodiment uses FFS system among transverse electric field systems that display images by applying the in-plane electric field to the liquid crystal to control alignment of the liquid crystal. In addition, a circuit configuration and the entire configuration of the liquid crystal device 300 according to the present embodiment are the same as the liquid crystal device 100 according to the first embodiment. In each drawing referred in the present embodiment, the same parts as the liquid crystal device 100 according to the first embodiment shown in FIGS. 1 to 5 are represented by the same reference numerals, and the descriptions thereof will be omitted.

As shown in FIG. 7, the dot region of the liquid crystal device 300 includes elongated pixel electrode (second electrode) 9 extending in a Y axis direction having a comb shape in plan view and the common electrode (first electrode) 119 extending in a X axis direction with a substantially comb shape in a plan view. A columnar spacer 40 is provided in the upper-left corner in the drawing so as to separate the TFT array substrate 10 and the counter substrate 20 with a predetermined interval.

The common electrode 119 is disposed by being extended in the X axis direction throughout the entire image display regions.

In present embodiment, the common electrode 119 is a conducting layer formed of transparent materials such as ITO (Indium Tin Oxide) or the like.

The dot region includes data lines 6a extending to the X axis direction, scanning lines 3a extending in the Y axis direction, and a capacitive line 3b extended parallel to the scanning lines 3a at peripherals of the dot region which is opposite to the scanning line 3a. Each of the TFTs 30 is provided at a vicinity of the intersections of the data line 6a and the scanning lines 3a. Each of the TFTs 30 includes a semiconductor layer 35 formed of amorphous silicon which is partially provided in a planar region of the scanning line 3a and a source electrode 6b and a drain electrode 132 which partially overlap the semiconductor layer 35 in a plan view. Each of the scanning line 3a functions as gate electrodes of the TFTs 30 in a portion overlapping the semiconductor layer 35 in a plan view.

The source electrode 6b of each of the TFTs 30 is branched from the data line 6a and extending in the semiconductor layer 35, so that the source electrode 6b forms in a substantially L shape in a plan view. The drain electrode 132 is electrically connected to the capacitor electrodes 131 which extend in −Y direction in a plan view. On the capacitor electrode 131, the contact 9b of the pixel electrode 9 is disposed by being extended from −Y direction. A pixel contact hole 45 which electrically connects the capacitor electrode 131 and the pixel electrode 9 is provided in a portion that the capacitor electrode 131 overlaps the contact 9b. In addition, the storage capacitor 70 is provided in a portion that the capacitor electrode 131 overlaps the capacitive lines 3b in a plan view. The storage capacitor 70 allows the capacitor electrode 131 and the capacitive line 3b, which is opposite to the capacitor electrode 131 in a thickness direction, to function as the electrodes.

In addition, the pixel electrode 9 is connected to the contact 9b and includes the edge 9a and three strip electrodes 9c which extend in a −Y direction from the corresponding edge 9a. A plurality of dielectric films 9d which covers a part of the strip electrodes 9c are provided in respect to each of the strip electrodes 9c, respectively. Portions which are not covered by the dielectric films 9d are electrode exposure parts 9e in which surfaces of the strip electrodes 9c are exposed. Accordingly, the dielectric films 9d are provided on both sides of the electrode exposure parts 9e.

Here, a relative positional relationship of the dielectric films 9d and the electrode exposure parts 9e at the strip electrodes 9c will be described.

As shown in FIG. 7, the intervals in which the dielectric films 9d are provided at the right and left strip electrodes 9c are the same. In addition, the dielectric film 9d of the strip electrode 9c on the center is disposed so as to face the center of the electrode exposure parts 9e in the right and left strip electrodes 9c. That is, the electrode exposure part 9e provided in the strip electrodes 9c and the electrode exposure part 19e provided in the strip electrodes 19c are alternately disposed at different portions in the extending direction of the strip electrodes 9c. Accordingly, the dielectric films 9d are disposed between the strip electrodes 9c at regular intervals.

The materials of the dielectric films 9d may be transparent materials such as inorganic or organic materials described in the first embodiment. Accordingly, the dielectric films 9d and 19d are transparent such that the display light can pass through the dielectric films 9d so as not to reduce aperture ratio. A method of forming the dielectric film 9d is the same as the first embodiment.

Figure 8:
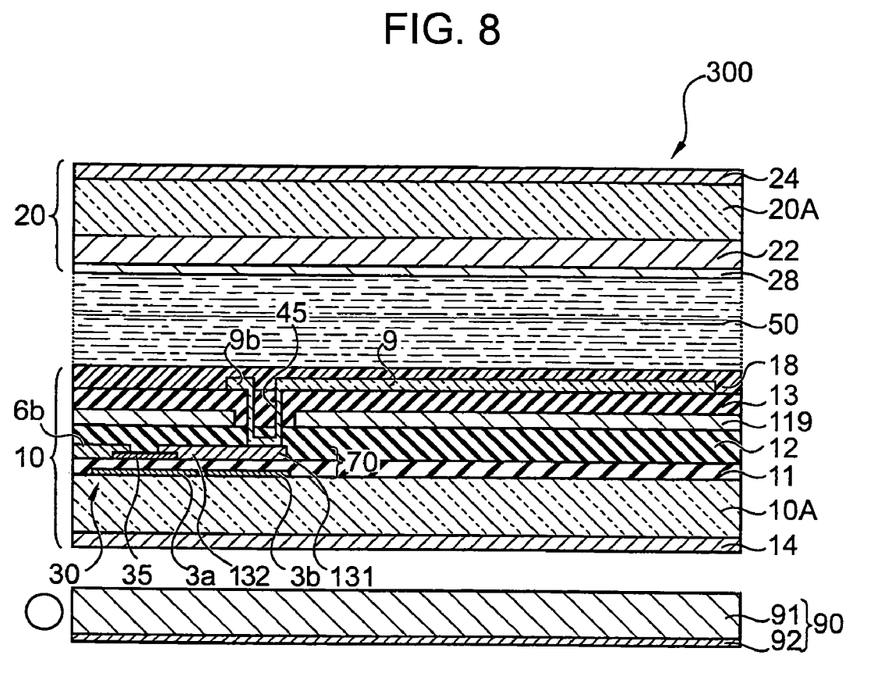
FIG. 8 is a cross-sectional view taken along the line VIII-VIII of FIG. 7.

With reference to a cross-sectional structure of FIG. 8, the liquid crystal layer 50 is interposed between the TFT array substrate 10 and the counter substrate 20 which is opposite to the TFT array substrate 10. The TFT array substrate 10 uses the substrate body 10A as a base substrate and includes the scanning line 3a and the capacitive line 3b disposed in the inner side of the substrate body 10A (a side facing the liquid crystal layer 50) and the gate insulating film 11 which covers the scanning line 3a and the capacitive line 3b.

The semiconductor layer 35 of amorphous silicon is provided on the gate insulating film 11. The source electrode 6b and the drain electrode 132 are also provided on the gate insulating film 11 by being overlapped with a part of the semiconductor layer 35. The capacitor electrode 131 is provided on the right side of the drain electrode 132 and integrally formed as one in the drawing. The semiconductor layer 35 formed to face the scanning line 3a through the gate insulating film 11 and the scanning line 3a consists of the gate electrodes of the TFT 30 in the corresponding opposite area.

The capacitor electrode 131 is formed to face the capacitive line 3b through the gate insulating film 11. The storage capacitors 70, which allows the insulating film 11 function as the dielectric film, is provided in the region that the capacitor electrode 131 faces the capacitive line 3b.

The first interlayer insulating film 12 is provided by covering the semiconductor layer 35, the source electrode 6b, the drain electrode 132, and the capacitor electrode 131. The common electrode 119 which is formed of the transparent conductive material such as ITO is provided on the first interlayer insulating film 12. Accordingly, in the liquid crystal device 300 according to the present embodiment, a region of the one dot region that overlaps a planar region of the common electrode 119 and a planar region including the pixel electrode 9 perform display by modulating the light that is received from the back light 90 to pass the liquid crystal layer 50.

A second interlayer insulating film 13 is provided on the common electrode 119. The second interlayer insulating film 13 covers the corresponding common electrode 119 and is formed of the silicon oxide or silicon nitride.

In the present embodiment, the second interlayer insulating film 13 is formed by accumulating the silicon nitride to 400 nm according to the plasma CVD system after forming the common electrodes. In addition, the pixel electrode 9 which is formed of the transparent conductive body such as ITO or the like is formed on the second interlayer insulating film 13. In addition, the pixel contact hole 45, which passes through the first insulating layer film 12 and the second insulating layer film 13 and extends to the capacitor electrode 31, is formed. A part of the contact 9b of the pixel electrode 9 is buried in the pixel contact hole 45 so as to electrically connect the pixel electrode 9 and the capacitor electrode 31. In addition, an aperture is formed in the common electrode 119 corresponding to the pixel contact hole 45 so as to prevent the pixel electrode 9 from being connected to the common electrode 119. On the pixel electrode 9, an alignment film 18 is provided in the region of the second interlayer insulating film 13 which covers the corresponding pixel electrode 9.

In the liquid crystal device 300 of the FFS system according to the present embodiment, the direction of the electric field is a little different from the IPS system according to the first embodiment. In the IPS system, the strip electrodes 9c and 19c of the pixel electrode 9 and the common electrode 19 are formed to face each other in a horizontal direction so as to generate the electric field in a horizontal direction. At the same time, in the FFS system, since the strip electrode 9c of the pixel electrode 9 are disposed to face the common electrodes 119 in a plan view, the electric field is generated from the strip electrode 9c in a horizontal direction and the electric flux line being generated from the strip electrode 9c moves toward the common electrodes 119 according to the distance from the strip electrode 9c.

Since the strip electrodes 9c are disposed to face a part of the common electrodes 119, the storage capacitors which uses the corresponding second interlayer insulating film 13 as the dielectric material are provided. Accordingly, the present embodiment uses a capacitance generated by the storage capacitors 70 and the storage capacitance generated by the strip electrodes 9c and the common electrode 119.

In the liquid crystal device 300 including the above configuration, if the voltage is applied to the pixel electrodes 9 through the TFT 30, the electric field having different dielectric property is generated around the dielectric films 9d. In addition, the intensity of the electric field around the dielectric films 9d is different from the intensity of the electric field around the electrode exposure parts 9e. These electric fields are generated toward the strip electrode 9c and move toward the common electrodes 119 according to the distance from the strip electrode 9c.

Accordingly, the equipotential line is distorted around the dielectric films 9d and the electrode exposure parts 9e. Further, the oblique electric field is generated and the liquid crystal molecules are rotated in accordance to the corresponding oblique electric field direction. Since the oblique electric field is generated around the parts on which the dielectric films 9d and the electrode exposure parts 9e are formed, the liquid crystal 50 in the dot regions rotates the liquid crystal molecules in a clockwise or counterclockwise direction.

As described above, the liquid crystal device according to the present embodiment has the same effect as the first and second embodiments. Accordingly, the equal coloration can be maintained even in a different viewing direction of the liquid crystal device 100.

In addition, in the present embodiment, since the pixels are displayed according to the FFS system, the strip electrodes 9c generates the electric fields in plan view and the electric flux line being generated from the strip electrodes 9c move toward the common electrodes 119 according to the distance from the strip electrode 9c. Accordingly, the liquid crystal molecules can be rotated by not only distorting the equipotential line around dielectric films 9d in the strip electrodes 9c and the electrode exposure parts 9e but also by using the electric fields to move toward the common electrodes 119.

Fourth Embodiment

Next, the liquid crystal device according to a fourth embodiment will be described with reference to FIG. 9.

Figure 9:
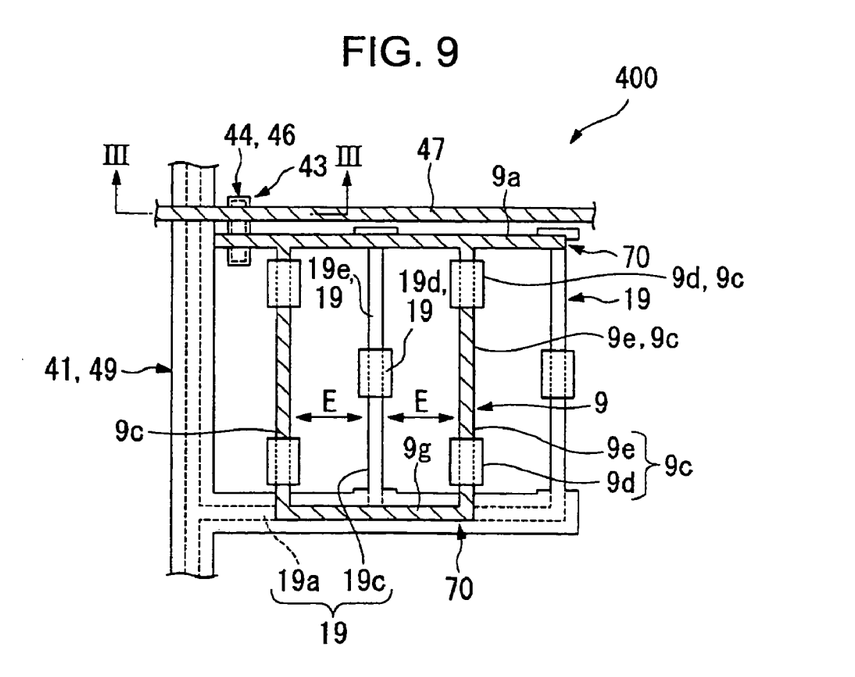
FIG. 9 is a plan view of an essential part in one dot region of a liquid crystal device according to a fourth embodiment of the invention.

FIG. 9 is a plan view showing one dot region in the liquid crystal device 400 according to the present embodiment.

The liquid crystal device according to the present embodiment includes TFD (Thin Film Diode) serving as switching elements and is a liquid crystal device according to an IPS system.

In addition, in each drawing referenced by the present embodiment, the same parts as those of the liquid crystal device 100 according to the first embodiment shown in FIGS. 1 to 5 are represented by the same reference numerals, and the descriptions thereof will be omitted.

As shown in FIG. 9, in a dot region of a liquid crystal device 400, a common electrode line 41 extends in a longitudinal direction, a signal line 47 extends in a horizontal direction. The corresponding common electrode line 41 and the signal line 47 intersect each other.

In addition, common electrodes (first electrodes) 19 are provided by being branched from a line of the common electrode line 41. The common electrode line 41 and the common electrodes 19 are formed of metal such as tantalum (Ta) or the like. Further, the common electrodes 19 include a main line 19a which is branched from the common electrode line 41 and extends in a transverse direction, and includes two strip electrodes 19c which are branched from the main line 19a and extends in a longitudinal direction. Among the main line 19a and the strip electrodes 19c, the strip electrodes 19c mainly functions as the common electrodes.

In addition, as shown in FIG. 9, the TFT element (Thin Film Diode) 43 is provided in the vicinity of the intersection of the common electrode line 41 and the signal line 47 of the one dot region.

As an overview of the configuration of the TFD element 43, an insulating film is interposed between lower electrodes and upper electrodes. In a specific explanation of the TFD element 43, the TFD element 43 includes the lower electrode 44, an electrode insulating film 46 which covers the upper surface of the lower electrode 44, the signal line 47 formed to face the lower electrode 44 through the electrode insulating film 46, and the pixel electrode (second electrode) 9.

That is, in the present embodiment, the signal line 47 and the pixel electrode 9 functions as the upper electrodes of the TFD element 43. The upper electrode that is electrically connected with the signal line 47 and the pixel electrode 9 may be provided. In the TFD element 43, two diodes are connected in back-to-back.

The signal line 47 is provided on the lower electrode 44 included in the TFD element 43 so as to cross the lower electrode 44. The pixel electrode 9 is provided on the lower electrode 44 so as to cross the lower electrode 44. The pixel electrode 9 includes the edge 9a which extends in the transverse direction at the part intersected by the lower electrode 44, two strip electrodes 9c which are branched from the corresponding edge 9a and extends in the longitudinal direction, and an extending portion 9g which extends in the transverse direction from the side which crosses the lower electrode 44 to the other side. The strip electrode 9c mainly functions as the pixel electrode. The signal line 47 and the pixel electrode 9 are formed of metal such as chrome (Cr) or the like.

As shown in FIG. 9, the main line 19a of the common electrodes 19 overlaps a part of the extending portion 9g of the pixel electrode 9 in a plan view. In the overlapped part, the main line 19a and the extending portion 9g are opposite to each other through the thick upper insulating film 49 formed of, for example, the tantalum nitride film and the main line 19a and the extending portion 9g are included in the storage capacitors 70. Even though the overlapping parts are small in comparison with the overlapping part between the main line 19a and the extending portion 9g, front part of the strip electrodes 19 partially overlap the edge 9a of the pixel electrode 9 in a plan view, and the same number of storage capacitors 70 are provided as described above.

In addition, the strip electrodes 19c of the common electrodes 19 and the strip electrodes 9c of the pixel electrodes 9 extend in the longitudinal direction and disposed to face to each other at regular intervals.

Further, in the present embodiment, same as the first embodiment, the dielectric films 9d and 19d and the electrode exposure part 9e and 19e are provided in the strip electrodes 9c and 19c. In addition, the relative positional relationship of the dielectric films 9d and 19d and the electrode exposure part 9e and 19e are the same as the first embodiment. Further, in the present embodiment, one dielectric film 19d is provided in the strip electrode 19c and two dielectric films 9d are provided in the strip electrode 19c.

Hereinafter, the difference between the present embodiment and the first embodiment will be described. In the first embodiment, the dielectric films 9d and 19d are formed by the same process but in the present embodiment, the dielectric film 19d and the upper insulating film 49 are formed by an anodic oxidation of the same process and an anodic oxide film of the strip electrode 19c is partially removed. Thus, the electrode exposure part 19e is formed and the dielectric film 19d is formed by pattern.

As described above, the liquid crystal device according to the present embodiment can achieve the same effect as the first embodiment. In particular, the oblique electric fields E1 and E2 which move different directions can be generated in around the dielectric films 9d and 19d and the electrode exposure parts 9e and 19e on the strip electrodes 9c and 19c. The liquid crystal molecules are rotated in clockwise or counterclockwise directions according to the corresponding oblique electric fields E1 and E2. Accordingly, the equal coloration can be maintained even in a different viewing direction of the liquid crystal device 400.

Electronic Apparatus

Figure 10:
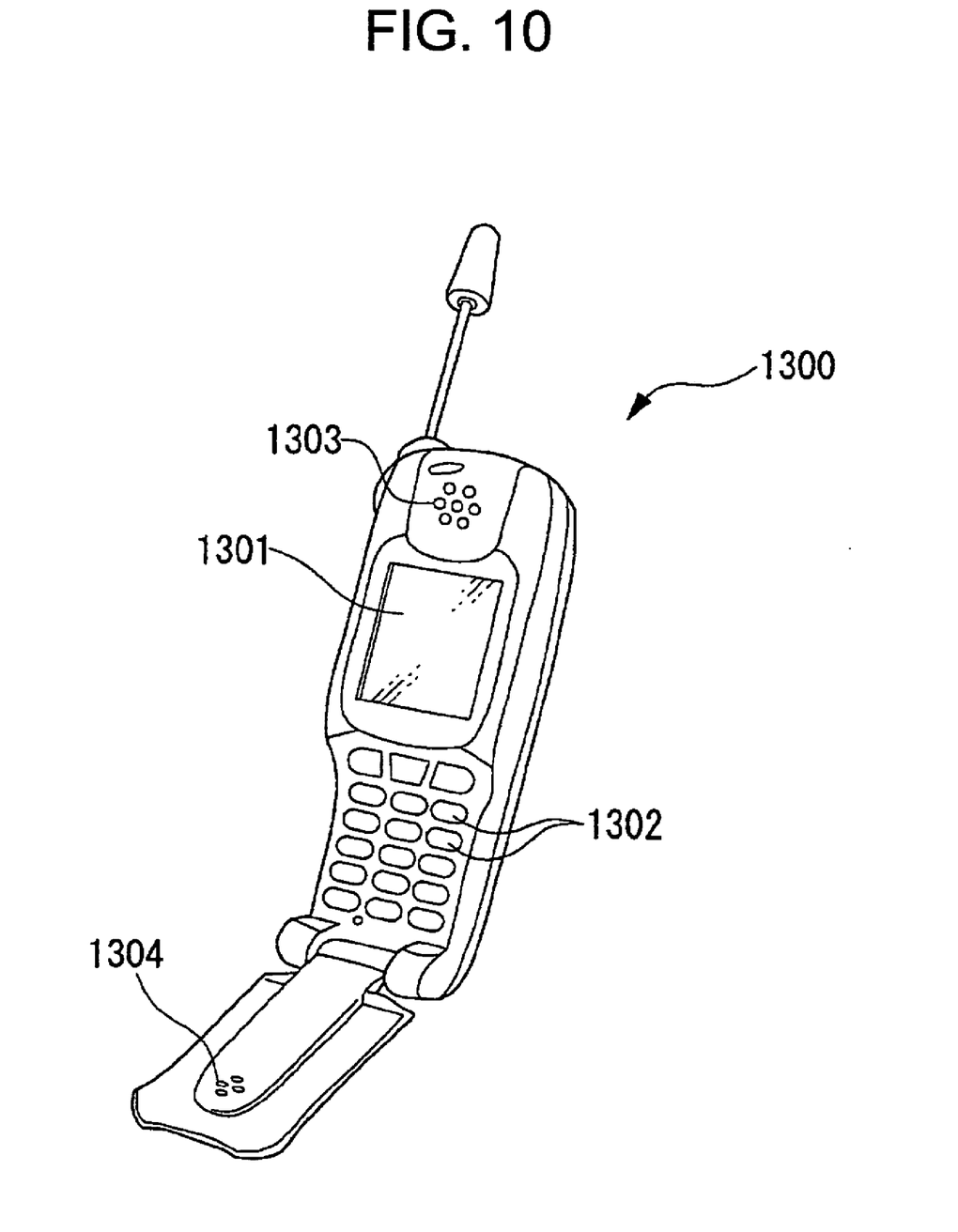
FIG. 10 is a perspective view of an example of an electronic apparatus.

FIG. 10 is a perspective view of a cellular phone that is an example of the electronic apparatus which includes the liquid crystal device, according to the invention, serving as a display unit. The cellular phone 1300 includes a small-sized display unit 1301 using the liquid crystal device according to the invention, a plurality of operating buttons 1302, an ear piece 1303, and a mouth piece 1304.

The liquid crystal device according to described above embodiment is not limited to the cellular phone, and can be used as an image display unit of a device which includes an electric book, a personal computer, a digital still camera, a liquid crystal TV, a view finder type or monitor direct-view-type video tape recorder, a car navigation device, a pager, a personal digital assistance, an electronic calculator, a word processor, a workstation, a television phone, a POS terminal, or an apparatus with a touch panel. The coloration can be equally maintained in any of the electronic apparatus and even in a different viewing direction of the display unit 1301.

The entire disclosure of Japanese Patent Application No. 2005-097192, filed Mar. 30, 2005, is expressly incorporated by reference herein.

What is claimed is:

1. A liquid crystal device, comprising:
   a first substrate and a second substrate with a liquid crystal layer interposed therebetween;
   a first electrode and a second electrode disposed between the liquid crystal layer and the first substrate, a liquid crystal is controlled by an electric field applied between the first electrode and the second electrode;
   a first dielectric member partially arranged above the first electrode, whereby the first electrode is partially exposed at a first exposure part where no first dielectric member is arranged; and
   a second dielectric member partially-arranged above the second electrode, whereby the second electrode is partially exposed at a second exposure part where no second dielectric member is arranged,
   wherein the first dielectric member faces the second exposure part, and the first exposure part faces the second dielectric member.

2. The liquid crystal device according to claim 1, wherein the first dielectric member is arranged to face the center of the second electrode exposure part.

3. The liquid crystal device according to claim 2, wherein the second dielectric member is one of a pair of dielectric members, and the second electrode exposure part lies between the pair of dielectric members.

4. The liquid crystal device according to claim 1, wherein at least one of the first electrode and the second electrode includes a concave part whose width is partially thinned and the first or second dielectric member partially-arranged above the at least one of the first electrode and the second electrode is arranged in the concave part.

5. The liquid crystal device according to claim 1, wherein the first electrode and the second electrode are on a same layer.

6. The liquid crystal device according to claim 1, wherein one of the first electrode and the second electrode is connected to a thin film transistor.

7. The liquid crystal device according to claim 1, wherein one of the first electrode and the second electrode is connected to a thin film diode.

8. An electric apparatus comprising the liquid crystal device according to claim 1.

9. A liquid crystal device, comprising:
   a first substrate and a second substrate with a liquid crystal layer interposed therebetween;
   a first electrode disposed on the first substrate;
   an insulating layer disposed on the first electrode;
   a second electrode disposed on the insulating layer and including a first and a second stripe part, a liquid crystal being controlled by an electric field applied between the first electrode and the second electrode;
   a first dielectric member partially-arranged above the first stripe part, whereby the first stripe part is partially exposed at a first exposure part where no first dielectric member is arranged; and
   a second dielectric member partially-arranged above the second stripe part, whereby the second stripe part is partially exposed at a second exposure part where no second dielectric member is arranged,
   wherein the first dielectric member faces the second exposure part, and the first exposure part faces the second dielectric member.

10. The liquid crystal device according to claim 9, wherein the first dielectric member is arranged to face the center of the second electrode exposure part.

11. The liquid crystal device according to claim 10, wherein the second dielectric member is one of a pair of dielectric members, and the second electrode exposure part lies between the pair of dielectric members.

12. The liquid crystal device according to claim 1, wherein at least one of the first stripe part and the second stripe part includes a concave part whose width is partially thinned and the first or second dielectric member partially-arranged above the at least one of the first stripe part and the second stripe part is arranged in the concave part.

13. The liquid crystal device according to claim 9, wherein one of the first electrode and the second electrode is connected to a thin film transistor.

14. The liquid crystal device according to claim 9, wherein one of the first electrode and the second electrode is connected to a thin film diode.

15. An electric apparatus comprising the liquid crystal device according to claim 9.

* * * * *